F. L. PERRY.
CULTIVATOR.
No. 91,963.  Patented June 29, 1869.
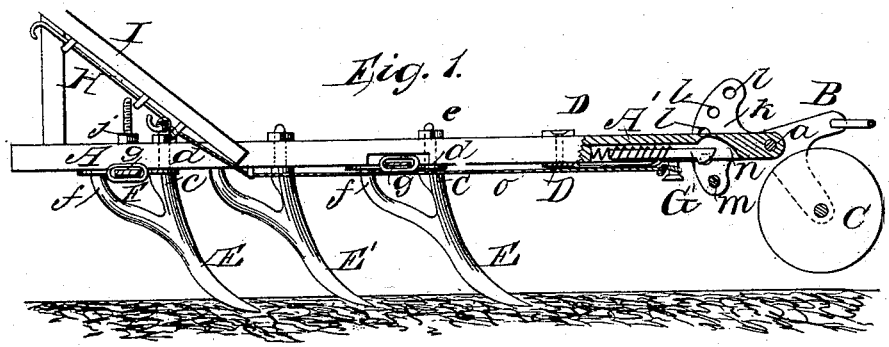
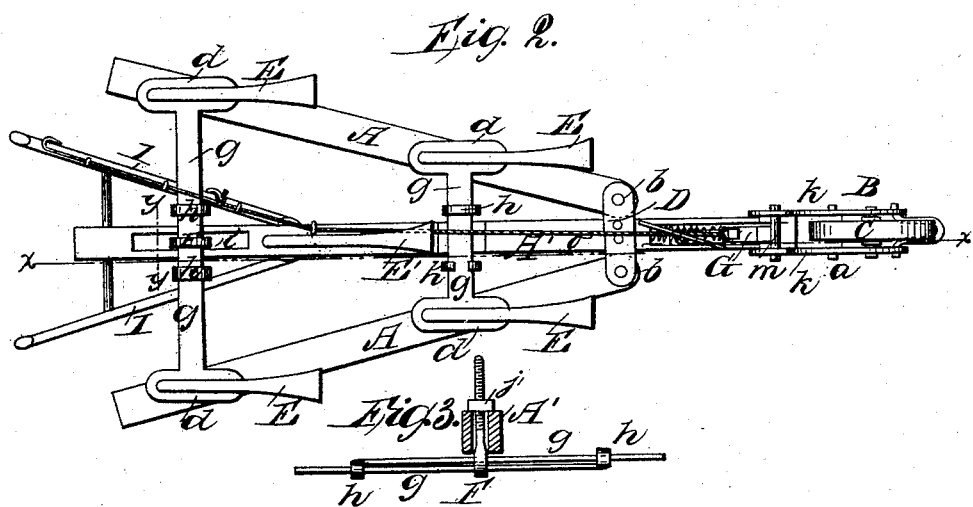
Witnesses:
Wm A Morgan
G C Cotton
Inventor:
F. L. Perry
per Munn & Co
Attorneys

United States Patent Office.

F. L. PERRY, OF CANANDAIGUA, NEW YORK.

Letters Patent No. 91,963, dated June 29, 1869.

---

IMPROVEMENT IN CULTIVATORS.

---

The Schedule referred to in these Letters Patent and making part of the same.

---

*To all whom it may concern:*

Be it known that I, F. L. PERRY, of Canandaigua, in the county of Ontario, and State of New York, have invented a new and useful Improvement in Cultivators; and I do hereby declare that the following is a full, clear, and exact description thereof, which will enable those skilled in the art to make and use the same, reference being had to the accompanying drawings, forming a part of this specification.

This invention relates to a new and improved cultivator, of that class which are constructed with a view of being expanded and contracted to suit the width of the spaces between the rows of plants.

The object of the invention is to obtain a cultivator of this class which will, in being expanded or contracted in width, automatically adjust the teeth, so that the latter will at all times, or under any adjustment of the harrow, be in line with the draught, or all the teeth of the cultivator be in parallel planes.

The invention has further for its object a means for regulating the depth of the penetration of the teeth into the earth.

In the accompanying sheet of drawings—

Figure 1 is a side sectional view of my invention, taken in the line $x\ x$, fig. 2.

Figure 2, an inverted plan of the same.

Figure 3, a transverse section of the same, taken in the line $y\ y$, fig. 2.

Similar letters of reference indicate corresponding parts.

The frame of my improved cultivator is composed of three beams, A A A', the central beam A' extending forward of the other two A A, and having a clevis, B, attached to it by a pivot-bolt, $a$, in the lower part of which a gauge-wheel, C, is fitted.

The front ends of the beams A A are secured by pivot-bolts $b\ b$, between the ends of plates D D, which are firmly bolted at right angles to the central beam A.

This admits of the expanding and contracting of the beams A A, as may be required.

E E' represent the teeth of the cultivator, two teeth E being attached to each beam A, and one tooth E' being attached to the central beam A'.

The tooth E' is permanently secured to its beam A', but the teeth E are pivoted to their beams A A, the upper parts of said teeth being forked, as shown in fig. 1, and the front prongs $c$ passing through the front ends of plates, or washers $d$, at the under sides of said beams, and also through the beams, and secured by nuts $e$, on their upper ends.

The rear prongs $f$ of the teeth simply pass through the plates $d$, in order to form a connection therewith.

Each plate $d$ has an arm, $g$, projecting from it at right angles, and the outer ends of these arms are provided with lips $h$, the lips of one arm being bent or lapped around the edges of its fellow arm, at the opposite side of the machine. This will be fully understood by referring to fig. 3.

The arms $g$ of the two rear teeth E of the beams A A pass through a guide, $f$, which is fitted in an oblong slot, $i$, in the rear part of the central beam A', (said guide having a nut, $j$,) by screwing up, while the guide is made to serve as a clamp to secure the beams A A in position, at a greater or less distance apart, as desired.

By this arrangement, it will be seen that the teeth of the cultivator are turned each time the beams A A are adjusted, and said teeth always kept in line with the draught, the plates $d$ serving as levers to turn or adjust the teeth as the beams A A are moved.

The clevis B is composed of two parts or plates $k\ k$, one at each side of the front part of beam A', and the rear portions of these plates are of segment-form, and perforated with holes $l$, shown clearly in fig. 1.

A rod, or bolt, $m$, is passed through any of these holes, underneath the beam A', in order to elevate or depress the gauge-wheel C, according to the depth of furrow required, and the under bolt $m$ is held up in a notch, $n$, in the under side of the beam A', by means of a spring-catch, G, which may be drawn back to release the bolt $m$, when required, by means of a slide rod, H, attached to one of the handles I of the machine, and connected to the spring-catch by a chain, or cord, $o$.

Having thus described my invention,

What I claim as new, and desire to secure by Letters Patent, is—

1. The attaching of the teeth E to the beams A, by having the front prongs $c$ of the teeth pass through the front ends of plates $d$, and the rear prongs $f$ fitted in the rear parts of the plates, in combination with the arms $g$ of the plates, the arms of each pair of plates being fitted together, and all constructed and arranged substantially as shown and described, to admit of the turning or adjusting of the teeth as the beams A A are expanded or contracted, as set forth.

2. The adjusting of the clevis-plates $k\ k$, by means of the bolt $m$, fitted in any of a series of holes, $l$, in said plates, in connection with the spring-catch G, all constructed and arranged to admit of the adjustment of the gauge-wheel C, substantially as and for the purpose set forth.

The above specification of my invention, signed by me this 22d day of June, 1868.

F. L. PERRY.

Witnesses:
 A. HEMINWAY,
 DAVID M. HULSE.